United States Patent [19]

Okamoto et al.

[11] 4,384,941
[45] May 24, 1983

[54] PROCESS FOR ELECTROLYZING WATER

[75] Inventors: Jiro Okamoto, Takasaki; Isao Ishigaki, Maebashi; Hiroyuki Harada, Yokohama, all of Japan

[73] Assignees: Japan Atomic Energy Research Institute; Chlorine Engineers Corp. Ltd., both of Tokyo, Japan

[21] Appl. No.: 345,528

[22] Filed: Feb. 3, 1982

[30] Foreign Application Priority Data

Feb. 6, 1981 [JP] Japan .................................. 56/16430

[51] Int. Cl.$^3$ .......................... C25B 1/04; C25B 13/08
[52] U.S. Cl. ...................................... 204/129; 204/296
[58] Field of Search ................................ 204/129, 296

[56] References Cited

U.S. PATENT DOCUMENTS

| | | | |
|---|---|---|---|
| 3,247,133 | 4/1966 | Chen et al. | 204/296 |
| 3,257,334 | 6/1966 | Chen et al. | 204/296 |
| 3,388,080 | 6/1968 | Körosy et al. | 204/296 |
| 4,039,409 | 8/1977 | La Conti et al. | 204/129 |
| 4,062,753 | 12/1977 | Falvo | 204/296 |

Primary Examiner—R. L. Andrews
Attorney, Agent, or Firm—Browdy and Neimark

[57] ABSTRACT

A process is, herein, disclosed for electrolysis or pure water in an electrolytic cell which is divided into an anode compartment and a cathode compartment by a cation exchange membrane and in which pure water is supplied to the anode compartment for electrolysis to generate oxygen in the anode compartment and hydrogen in the cathode compartment, said cation exchange membrane being produced by grafting a fluorovinyl sulfonic acid monomer onto a membranous polymeric substrate having a monomer unit of the formula:

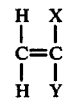

(wherein X is hydrogen, fluorine or CH$_3$; and Y is hydrogen or fluorine), said cation exchange membrane being used in close contact with an anode and a cathode.

7 Claims, No Drawings

PROCESS FOR ELECTROLYZING WATER

FIELD OF THE INVENTION

The present invention relates to a process for electrolyzing water.

BACKGROUND OF THE INVENTION

Conventionally, water containing caustic alkali rather than pure water is used in water electrolysis to produce pure hydrogen and oxygen because pure water does not have satisfactorily high electrical resistance. But the aqueous alkaline solution may corrode the electrolyte cell or may form a gas contaminated by alkaline gas.

A method has been proposed for electrolyzing pure water in an electrolytic apparatus which uses a solid polymeric electrolyte made of a cation exchange membrane having anodic and cathodic-catalysts bonded to opposite sides (see, for example, U.S. Pat. No. 4,039,409. Since the cation exchange resin used in this method must have high ion conductivity, strong bond to anodic and cathodic catalysts, high heat resistance, great resistance to oxidation and low gas permeability, the use of a perfluorocarbon cation exchange membrane having good chemical and heat resistance properties has been considered necessary. The most famous perfluorocarbon cation exchange membrane is "NAFLON" which is a trade name for a perfluorosulfonated membrane sold by Du Pont. This membrane is manufactured as a copolymer of tetrafluoroethylene and a sulfonyl-containing monomer capable of introducing an ion exchange group. But the conventional cation exchange membrane is not very much used in commercial electrolysis of pure water since it involves complex polymerization procedure and is costly.

SUMMARY OF THE INVENTION

Therefore, the primary object of the present invention is to provide a practical method of electrolyzing pure water by using a sulfonate group containing cation exchange membrane that exhibits high performance in electrolysis of pure water and which yet can be manufactured at fairly low cost.

The present invention relates to a process for electrolysis of pure water in an electrolytic cell which is divided into an anode compartment and a cathode compartment by a cation exchange membrane and in which pure water is supplied to the anode compartment for electrolysis to generate oxygen in the anode compartment and hydrogen in the cathode compartment. The cation exchange membrane used in the process of the present invention is produced by grafting a fluorovinyl sulfonic acid monomer onto a membranous polymeric substrate having a monomer unit of the formula:

(wherein X is hydrogen, fluorine or $CH_3$; and Y is hydrogen or fluorine). The cation exchange membrane is used in close contact with an anode and a cathode.

To provide a desired cation exchange membrane at fairly low cost, the present inventors chose a process wherein a cation exchange group was introduced into a preformed membranous substrate that is available at fairly low cost, and examined which combination of preformed membranous substrates and cation exchange group containing monomers to be grafted was the best in consideration of the ease of grafting, the performance of the resulting cation exchange membrane and economy. As a result, the present inventors have found that the polymer from which the membranous substrate is prepared and which must have high activity to radiation must contain hydrogen as a group to be attached to the carbon chain, that such activity is increased with increasing hydrogen content, and that the hydrocarbon membrane of this nature is satisfactory as a membrane substrate since it is resistant to oxidation by a redox catalyst that otherwise deteriorates a cation exchange membrane being used in electrolysis of water. Therefore, the polymer used as a membranous substrate in the present invention is a homopolymer or copolymer of $CH_2=CH_2$, $CH_2=CH.CH_3$, $CH_2=CHF$, $CH_2=CF.CH_3$ and $CH_2=CF_2$. Polyethylene is most preferred in the present invention. The membranous polymeric substrate used in the present invention may be supported by a reinforcing material which is made of, say Teflon fiber, poly(ethylene-tetrafluoroethylene) fiber, polyvinyl chloride fiber, polypropylene fiber, poly(vinyl chloride-vinylidene chloride) fiber, polyethylene terephthalate fiber, carbon fiber or glass fiber. While the hydrocarbon polymer substrate is resistant to deterioration during electrolysis, the ion exchange group containing monomer to be introduced into the substrate desirably contains as much fluorine as possible and the least possible hydrogen content to have maximum resistance to deterioration. Furthermore, to provide a cation exchange membrane having low electrical resistance, it is necessary to introduce a monomer containing sulfonyl group which can be converted into a strong acid group after grafting. For these reasons, the present invention uses fluorovinyl sulfonic acid monomers as the monomer to be grafted onto the membranous polymeric substrate. These monomers are represented by the following formulae:

$$CF_2=CF(CF_2)_n SO_2Z \qquad (a)$$
$$R_1-CF=CF-SO_2Z \qquad (b)$$

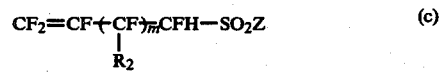

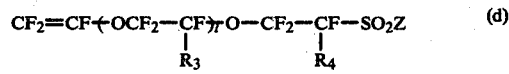

(wherein n is 0 or 2; m is an integer of 1 to 5; l and k are each an integer of 1 to 3; Z is fluorine, hydroxyl, $NH_2$, $ONH_4$ or OM, M being an alkali metal; $R_1$ and $R_2$ are each fluorine or a perfluoroalkyl group having 1 to 5 carbon atoms; $R_3$ and $R_5$ are each fluorine or $CF_3$; $R_4$ and $R_6$ are each fluorine or a perfluoroalkyl group having 1 to 10 carbon atoms).

Various methods for preparing these monomers are described in prior art references such as U.S. Pat. Nos. 3,041,317; 3,282,875; 3,714,245; 3,718,627; and Japanese Patent Publication Nos. 7949/66 and 21408/68.

The cation exchange membrane used in the present invention is produced by grafting the fluorovinyl sulfonic acid monomer onto the above described membranous polymeric substrate with ionizing radiation.

According to the present invention, the fluorovinyl sulfonic acid monomer is grafted onto the membranous polymeric substrate by exposure to ionizing radiation, and sources of the ionizing radiation are α-rays, β-rays, γ-rays and accelerated electron beams. Because of ease of handling and grafting on a commercial basis, γ-rays and accelerated electron beams are preferred.

The graft polymerization to produce the cation exchange membrane of the present invention is performed by any of the following three methods:

(a) a membranous polymeric substrate that has been exposed to ionizing radiation is brought into contact with a solution of a fluorovinyl sulfonic acid monomer;

(b) a membranous polymeric substrate is brought into contact with a solution of a fluorovinyl sulfonic acid monomer, and the mixture is then exposed to ionizing radiation; and (c) a membranous polymeric substrate that has been exposed to ionizing radiation is brought into contact with a solution of a fluorovinyl sulfonic acid monomer, and the mixture is again exposed to ionizing radiation.

These methods can be performed in combination if the type of the substrate or monomer, or the desired graft ratio so requires. The membranous polymeric substrate can be brought into contact with the solution of fluorovinyl sulfonic acid monomer by various methods such as spraying, brushing and immersion, but usually, immersion of the substrate in the monomer solution is preferred. To achieve through impregnation of the substrate with the monomer, a solvent miscible with the monomer, such as benzene, toluene, xylene, ethylene dichloride or perfluorocarbon solvent, may be used.

The dose of ionizing radiation varies with the irradiation conditions such as atmosphere and temperature, as well as the type of the substrate and monomer, and usually, a dose of 0.5 to 20 Mrad is suitable. The irradiation atmosphere may consist of air, inert gas or any suitable gas, but to achieve efficient graft polymerization, an inert gas is preferred. After the fluorovinyl sulfonic acid monomer is grafted onto the membranous polymeric substrate, the substrate is washed with toluene or other solvents to remove the unreacted monomer or homopolymer. If a monomer containing —$SO_2F$ group is used as the fluorovinyl sulfonic acid monomer, it may be reacted, after grafting, with ammonia, alkali hydroxide or an inorganic acid to convert the —$SO_2F$ group to —$SO_2NH_2$ group, —$SO_3M$ group (M is an alkali metal) or —$SO_3H$ group, and if necessary, the —$SO_3H$ group may be further reacted with ammonia to be converted to —$SO_3NH_4$ group.

The electrodes used in the process of the present invention are fabricated by the following method. First, the anodic catalyst is made of a platinum group metal such as Ru, Rh, Pd, Os, Ir or Pt and/or an oxide of these platinum group metals. A binary, ternary or quaternary alloy of Pt, Ir or Ru or oxides thereof are particularly preferred. The cathodic catalyst is made of a platinum group metal such as platinum black. These anodic and cathodic catalysts are deposited on a substrate of titanium or other metals in the form of a mesh, porous plate or bars. Electrode compartments are made by placing the cation exchange membrane between the anode and cathode in close contact therewith, or instead, the anodic catalyst and cathodic catalyst are deposited on opposite sides of the cation exchange membrane to form a catalytic layer directly on each side of the membrane and then a current collector is pressed against each catalytic layer. In the latter case, the desired catalyst layer can be formed by pressing the respective catalysts against the membrane together with carbon powder and a suitable bonding agent such as polytetrafluoroethylene, or alternatively, a metal salt solution from which the catalyst metal can be precipitated is placed on the membrane and is brought into contact with a solution of a reducing agent to deposit the catalyst metal directly on the membrane.

In the manner described above, the anode is formed in close contact with one side of the cation exchange membrane and the cathode on the other side, to thereby form anode and cathode compartments on opposite sides of the membrane. The anode compartment so produced is supplied with pure water which is electrolyzed with d.c. current. The pure water to be supplied must be as free of metal ions (e.g. $Ca^{2+}$, $Mg^{2+}$, $Fe^{2+}$, $Zn^{2+}$, $Cu^+$, $Ni^{2+}$ or $Cr^{2+}$) as possible to provide deionized water having a specific resistance of $1 \times 10^6$ ohms·cm$^2$(25° C.) or more. This is necessary for preventing deterioration of the membrane due to redox reaction and avoiding increasing voltage across the mmebrane due to the trapping of metal ions in the membrane.

During the electrolysis, oxygen is generated on the anode following the reaction scheme indicated below:

$$H_2O \rightarrow 1/2O_2 + 2H^+ + 2e^- \qquad (1)$$

The hydrogen ion produced permeates the cation exchange membrane toward the cathode on which hydrogen is generated following the reaction scheme indicated below:

$$2H^+ + 2e^- \rightarrow H_2 \qquad (2)$$

The migration of hydrogen ion causes some water to be transferred into the cathode compartment. The oxygen generated in the anode compartment leaves there together with undecomposed water and enters a water-oxygen separator where it is separated from water. The hydrogen generated in the cathode compartment leaves there together with the water that accompanies the migration of hydrogen ion, and enters a water-hydrogen separator where it is separated from water.

The cation exchange membrane used in the present invention is made of a hydrocarbon membranous polymeric substance that has a small number of fluorine atoms attached to the carbon chain and which has introduced therein a fluorovinyl sulfonic acid monomer by graft polymerization. Therefore, the membrane has the ion exchange group introduced uniformly, has small electrical resistance, has great resistance to oxidation and is less deteriorated during electrolysis of pure water. For these reasons, the present invention permits consistent electrolysis for an extended period of time. The membrane also has great advantage as to economy since it uses as a substrate a shaped hydrocarbon membrane that is available at fairly low cost.

The present invention is now described in greater detail by reference to the following examples to which the invention is by no means limited.

EXAMPLE 1

A low-density polyethylene (ASAHI DOW "F-2135") membrane 100μ thick was irradiated with electron beams from a resonance transformer electron beam accelerator (2 MV, 1 mA) to give a total dose of 10 Mrad. The polyethylene membrane was then put in a reaction vessel which was evacuated to $10^{-4}$ mmHg and charged with $CF_2=CFSO_2F$ in which the dissolved oxygen had been replaced by nitrogen. The polyethylene membrane thus immersed in $CF_2=CFSO_2F$ was held at room temperature for 5 hours to perform graft polymerization. After the reaction, the membrane was taken out of the vessel, washed with toluene to remove the unreacted monomer, and dried. The dried membrane had a graft ratio of 53%.

The membrane was then immersed in a solution (55 parts of methanol, 40 parts of water and 5 parts of NaOH) at 80° C. for 24 hours. The so treated membrane had an electrical resistance of 3.6 $\Omega\cdot cm^2$ as measured in 0.5 N NaCl (25° C.) at 1 KHz a.c., and an ion exchange capacity of 1.9 meq/g-dry resin wt. An anode was made of a titanium bar (2 mm in diameter and 45 mm long) that was coated with a layer of 70% iridium oxide and 30% ruthenium oxide by pyrolysis. A cathode was made of a titanium bar (2 mm in diameter and 45 mm long) coated with a platinum layer by electroplating. An electrolytic cell was constructed by sandwiching the cation exchange membrane (50 mm × 50 mm) between eleven parallel anodes (spacing of 3 mm) and the same number of parallel cathodes (spacing 3 mm) so that the membrane was in close contact with the electrodes. The anode compartment was supplied with de-ionized pure water having a specific resistance of $5\times10^6$ $\Omega\cdot cm$ (25° C.) a temperature of 40° C. The water supply rate was 0.1 l/hr, and electrolysis was conducted with a d.c. current of 6 amperes. In the anode compartment, oxygen was generated in an amount of 1.789 g/hr, and in the cathode compartment, hydrogen was generated in an amount of 0.225 g/hr. The current efficiency and average cell voltage were 99.7% and 2.5 volts (40° C.), respectively. Throughout the continuous operation 60 days, there occurred no change in the average cell voltage or current efficiency. The weight of the membrane was decreased by 0.02% and its electrical resistance was 3.6 $\Omega\cdot cm^2$.

EXAMPLE 2

A grafted membrane was produced as in Example 1 except that a polyvinyl fluoride (Du Pont "TEDLER") membrane 100μ thick was used as a substrate. The membrane had a graft ratio of 37%, an electrical resistance of 4.4 $\Omega\cdot cm^2$, and an ion exchange capacity of 1.6 meq/g-dry resin wt.

The membrane was used in electrolysis of pure water as in Example 1. The current efficiency and average cell voltage were 99.7% and 2.6 volts, respectively. After 50 days of continuous operation, the weight of the membrane was decreased by 0.02% and the electrical resistance was 4.4 $\Omega\cdot cm^2$.

EXAMPLE 3

A high-density polyethylene (ASAHI CHEMICAL INDUSTRY CO., LTD. "F-400") membrane 120μ thick was immersed in a mixed solution comprising 20 parts of $CF_2=CF-CF_2-CFH-SO_2F$ and 80 parts of toluene, and the reaction system was purged of air by freeze-evacuation to $10^{-4}$ mmHg. The membrane was irradiated with γ-rays from Co-60 in a dose rate of $1\times10^5$ rad/hr for 10 hours at room temperature. The grafted membrane was recovered from the monomer solution, washed with toluene thoroughly and dried. The membrane had a graft ratio of 38%.

The membrane was then immersed in a mixture of 50 parts of dimethyl sulfoxide, 40 parts of water and 10 parts of NaOH for 8 hours at 40° C., and its electrical resistance was measured as in Example 1. The membrane had an electrical resistance of 3.8 $\Omega\cdot cm^2$ and an ion exchange capacity of 1.0 meq/g-dry resin wt.

The membrane was used in electrolysis of pure water as in Example 1. The current efficiency and average cell voltage were 99.8% and 2.6 volts (40° C.). After 45 days of continuous operation, the weight of the membrane was decreased by 0.01% and the electrical resistance was 3.8 $\Omega\cdot cm^2$.

EXAMPLE 4

A low-density polyethylene (ASAHI DOW "F-2135") membrane 80μ thick was irradiated with electron beams as in Example 1 to give a total dose of 5 Mrad. The membrane was immersed in a mixed solution made of 40 parts of

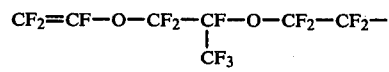

$SO_3Na$ containing 0.25% of Mohr's salt and 60 parts of water (the content of dissolved oxygen in the solution had been reduced to 0.5 ppm or less by nitrogen bubbling) and the reaction mixture was held at room temperature for 5 hours. The grafted membrane was thoroughly washed with water and dried. The resulting membrane had a graft ratio of 75%. Its electrical resistance was measured as in Example 1 and was found to be 4.9 $\Omega\cdot cm^2$. Its ion exchange capacity was 0.85 meq/g-dry resin wt.

The membrane was used in electrolysis of pure water as in Example 1. The current efficiency and average cell voltage were 99.7% and 2.7 volts (40° C.). After 60 days of continuous operation, the weight of the membrane was decreased by 0.01% and the electrical resistance was 4.9 $\Omega\cdot cm$.

EXAMPLE 5

A grafted polymer was prepared as in Example 1 except that $CF_2=CF-SO_2F$ was grafted onto an ethylene/vinyl fluoride (wt ratio=60:40) copolymer membrane having a thickness of 150μ. The graft ratio was 60%. The membrane was immersed in a mixed solution comprising 55 parts of methanol, 40 parts of water and 5 parts of NaOH at 70° C. for 24 hours. The so treated membrane had an ion exchange capacity of 1.7 meq/g-dry resin wt and an electrical resistance of 4.4 $\Omega\cdot cm^2$.

The membrane was used in electrolysis of pure water as in Example 1. The current efficiency and average cell voltage were 99.7% and 2.6 volts (40° C.). After 70 days of continued operation, the weight of the membrane was decreased by 0.01% and the electrical resistance was 4.4 $\Omega\cdot cm^2$.

EXAMPLE 6

The grafted membrane prepared in Example 1 was boiled in a 5% aqueous hydrochloric acid solution for 30 minutes to convert the ion exchange group into $-SO_3H$ form. The membrane was boiled in deionized water for an additional 60 minutes. The so treated membrane (8 cm × 8 cm) was placed in a reaction vessel to divide it into two sections in such a manner that the center (5 cm×5 cm) of the membrane was exposed. One section of the vessel was supplied with a 15% aqueous solution of hydrated hydrazine and the other section was supplied with a 3% aqueous solution of chloroplatinic acid. After standing at 20° C. for 30 minutes, a platinum catalyst layer was formed in the area (5 cm×5 cm) of the membrane exposed to the solution of chloroplatinic acid. Analysis showed that the catalyst layer contained 4 mg/cm² of platinum and was 6μ thick. The membrane was detached from the vessel, washed with water, and replaced in the vessel. The section of the vessel in which the side of the membrane having the platinum catalyst layer was exposed was supplied with a 15% aqueous solution of hydrated hydrazine, and the other section was supplied with a 3% aqueous solution of chloroplatinic acid. After starting at 30° C. for 30 minutes, a platinum catalyst layer was formed in the area (5 cm×5 cm) of the other side of the membrane. The second catalyst layer contained 4 mg/cm² of platinum and was 5μ thick. After washing the membrane with water, one side of the so prepared catalyst electrode (5 cm×5 cm) was placed in contact with a niobium screen (5 cm×5 cm). The niobium screen was framed with a polysulfonate resin spacer (1 mm thick) having a width of 3 cm, and a titanium sheet (3 mm thick) measuring 8 cm×8 cm was attached to the niobium screen and spacer. The other side of the catalyst electrode was placed in contact with a zirconium screen (5 cm×5 cm). The zirconium screen was framed with a polysulfonate resin spacer (1 mm thick) having a width of 3 cm, and a titanium sheet (3 mm thick) measuring 8 cm×8 cm was attached to the zirconium screen and spacer. The respective electrode components were pressed against each other by bolting the two titanium sheets on the four corners at a pressure of 20 kg/cm as measured by a torque meter.

The electrode assembly was placed in an electrolytic cell; the titanium sheet on the niobium screen side was the anode, and the titanium sheet on the zirconium screen side was the cathode. The anode compartment was supplied with pure water (40° C., a specific resistance of $10 \times 10^6$ Ω·cm at 25° C.) at a rate of 0.42 l/hr, and electrolysis was conducted with a d.c. current of 25 amperes. Oxygen was generated in the anode compartment in an amount of 7.455 g/hr, and hydrogen was generated in the cathode compartment in an amount of 0.939 g/hr. The current efficiency was 99.9% and the average cell voltage was 2.6 volts (50° C.). No change in the cell voltage and current efficiency occurred throughout continued operation for 50 days.

EXAMPLE 7

The ion exchange membrane of Example 2 was subjected to a pretreatment as in Example 6, and a platinum catalyst layer was formed on both sides of the membrane as in Example 6, and the resulting electrode assembly was used in electrolysis of pure water as in Example 6. In the anode compartment, oxygen was generated in an amount of 7.448 g/hr, and in the cathode compartment, hydrogen was generated in an amount of 0.938 g/hr. The current efficiency and average cell voltage were 99.8% and 2.8 volts (50° C.). Throughout the continued operation for 55 days, no change occurred in the average cell voltage or current efficiency.

EXAMPLE 8

A platinum catalyst coating was formed on both sides of the ion exchange membrane of Example 4 as in Example 6, and the resulting electrode assembly was used in electrolysis of pure water as in Example 6. In the anode compartment, oxygen was generated in an amount of 7.455 g/hr and in the cathode compartment, hydrogen was generated in an amount of 0.939 g/hr. The current efficiency and average cell voltage were 99.9% and 2.8 volts (50° C.). Throughout the continued operation of 60 days, no change occurred in the average cell voltage or current efficiency.

What is claimed is:

1. A process for electrolysis of pure water in an electrolytic cell which is divided into an anode compartment and a cathode compartment by a cation exchange membrane and in which pure water is supplied to the anode compartment for electrolysis to generate oxygen in the anode compartment and hydrogen in the cathode compartment, said cation exchange membrane being produced by grafting a fluorovinyl sulfonic acid monomer onto a membranous polymeric substrate having a monomer unit of the formula:

(wherein X is hydrogen, fluorine or CH₃; and Y is hydrogen or fluorine), said cation exchange membrane being used in close contact with an anode and a cathode.

2. A process according to claim 1 wherein the fluorovinyl sulfonic acid monomer has the formula:

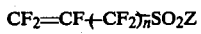

(wherein n is 0 or 2, and Z is fluorine, hydroxyl group, NH₂, ONH₄ or OM, M being an alkali metal).

3. A process according to claim 1 wherein the fluorovinyl sulfonic acid monomer has the formula:

(wherein R₁ is fluorine or a perfluoroalkyl group having 1 to 5 carbon atoms).

4. A process according to claim 1 wherein the fluorovinyl sulfonic acid monomer has the formula:

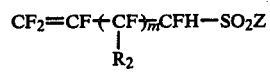

(wherein R₂ is fluorine or a perfluoroalkyl group having 1 to 5 carbon atoms).

5. A process according to claim 1 wherein the fluorovinyl sulfonic acid monomer has the formula:

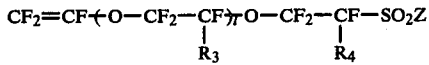

(wherein R₃ is fluorine or CH₃; R₄ is fluorine or a perfluoroalkyl group having 1 to 10 carbon atoms; and l is an integer of 1 to 3).

6. A process according to claim 1 wherein the fluorovinyl sulfonic acid monomer has the formula:

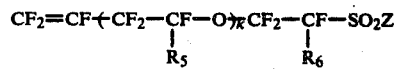
(wherein $R_5$ is fluorine or $CH_3$; $R_6$ is fluorine or a perfluoroalkyl group having 1 to 10 carbon atoms; and k is an integer of 1 to 3).
7. A process according to claim 1 wherein the membranous polymeric substrate is supported by a reinforcing material.
* * * * *